(12) United States Patent
Yang et al.

(10) Patent No.: US 6,377,313 B1
(45) Date of Patent: Apr. 23, 2002

(54) SHARPNESS ENHANCEMENT CIRCUIT FOR VIDEO SIGNALS

(75) Inventors: Feng Yang, Plano, TX (US); Chi-Hao Yang, San Jose, CA (US)

(73) Assignee: Techwell, Inc., San Jose, CA (US)

( * ) Notice: Subject to any disclaimer, the term of this patent is extended or adjusted under 35 U.S.C. 154(b) by 0 days.

(21) Appl. No.: 09/399,924

(22) Filed: Sep. 21, 1999

Related U.S. Application Data

(63) Continuation-in-part of application No. 09/387,389, filed on Sep. 2, 1999, now abandoned.

(51) Int. Cl.[7] .......................... H04N 5/21; H04N 9/77
(52) U.S. Cl. ................... 348/630; 348/712; 348/663
(58) Field of Search ........................... 348/625, 712, 348/630, 631, 663, 665, 606, 713; 382/264, 266; H04N 5/21, 9/77, 9/78

(56) References Cited

U.S. PATENT DOCUMENTS

| | | | |
|---|---|---|---|
| 4,875,017 A | 10/1989 | Sakazaki | 329/336 |
| 5,220,414 A | 6/1993 | Rabii et al. | |
| 5,491,520 A | 2/1996 | Nozawa et al. | 348/625 |
| 5,621,478 A | 4/1997 | Demmer | 348/639 |
| 5,790,205 A | 8/1998 | Pettit et al. | 348/629 |
| 5,848,181 A | * 12/1998 | Ogata | 382/264 |

OTHER PUBLICATIONS

Floyd M. Garner, "Interpolation in Digital Modems–Part I: Fundamentals", IEEE Transactions on Communications, vol. 41, No. 3, Mar. 1999.

* cited by examiner

*Primary Examiner*—Sherrie Hsia
(74) *Attorney, Agent, or Firm*—Dinh & Associates

(57) ABSTRACT

Techniques for enhancing edges in video signals while reducing the amounts of undershoots and overshoots. A video signal is processed to generate a first signal indicative of detected edges in the video signal. The first signal can be generated by lowpass filtering the video signal to generate a lowpass signal and subtracting the lowpass signal from a luminance signal that has been extracted from the video signal. The first signal is then processed with a "non-linear" transfer function to generate a second signal having enhanced edges. The second signal is used as the correction or enhancement signal, and is added to the lowpass signal to provide an output signal having enhanced edges with reduced or minimal amounts of undershoots and overshoots. The second signal has one or more of the following characteristics: (1) it is dynamically generated based on characteristics of the detected edges in the video signal; (2) it provides varying amounts of enhancement across the detected edges in the video signal; (3) it provides higher amounts of enhancement near the center of the detected edges and smaller amounts of enhancement away from the center; and (4) it provides an amount of enhancement that is dependent on the slope of the detected edges.

35 Claims, 12 Drawing Sheets

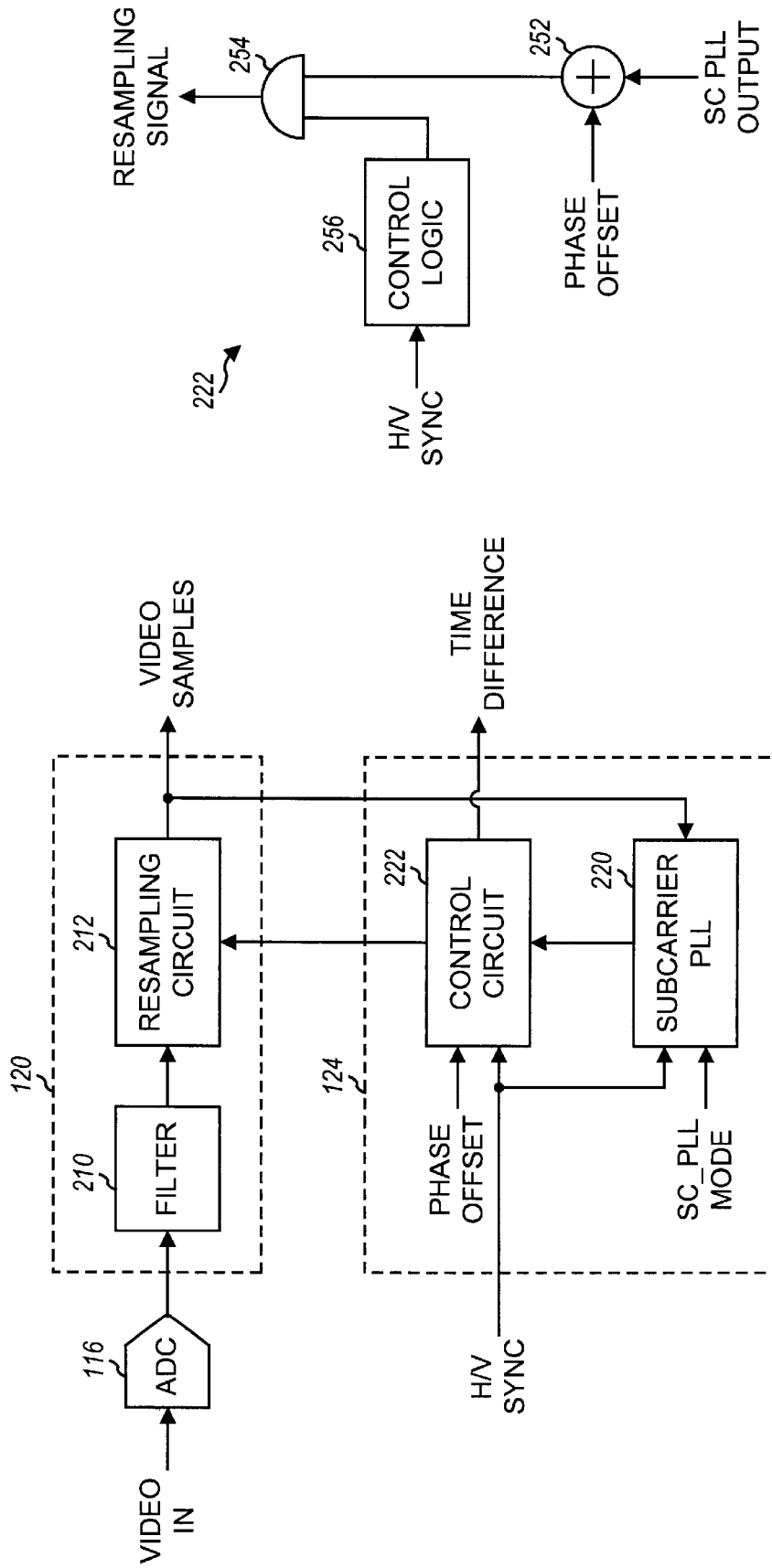

SHARPNESS ENHANCEMENT CIRCUIT FOR VIDEO SIGNALS

CROSS-REFERENCES TO RELATED APPLICATIONS

This application is a continuation-in-part of U.S. patent application Ser. No. 09/387,389, now abandoned, entitled "MULTI-STANDARD VIDEO DECODER," filed Sep. 2, 1999, which is also incorporated herein by reference in its entirety for all purposes.

BACKGROUND OF THE INVENTION

The present invention relates to video processing, and more particularly to circuit and method for adjusting the sharpness of edges in video signals.

Color video information is often transmitted and stored as a composite (or CVBS) signal that includes a luminance component (Y), a chrominance component (C), a blanking signal, and vertical and horizontal synchronization signals. The luminance component expresses the intensity (i.e., black to white) of a picture, and the chrominance component expresses color and its intensity. The composite signal is typically decoded into a luminance signal and color difference signals (e.g., U and V, or I and Q) prior to display on a television or a monitor.

A video picture can appear more sharp by properly processing the edges in the luminance signal. Specifically, by detecting black to white and white to black transitions in the picture, and increasing the rate or slope of the transitions, the picture will appear more sharp to the viewers. A sharper picture can provide more details, and is desirable in many applications.

Conventionally, sharpness enhancement of edges is performed by filtering a luminance signal with a filter (e.g., a bandpass filter), scaling the filtered signal with a gain factor, and summing the scaled signal with the luminance signal to generate an output signal having sharper edges. The filter is used to extract higher frequency components that are typically indicative of edges in the luminance signal. This technique for increasing sharpness is disclosed in U.S. Pat. No. 5,790,205, which is incorporated herein by reference.

Yet another technique for sharpening rising and falling edges of video signals is disclosed in U.S. Pat. No. 5,491,520, which is also incorporated herein by reference. In this technique, the luminance signal is differentiated to generate intermediate signals that are indicative of rising and falling edges in the video signals. The intermediate signals are further processed (e.g., scaled and limited) and summed with the luminance signal to provide an output signal having sharper edges.

These conventional techniques generally provide adequate performance by "linearly" processing the luminance signal. In the linear process, a particular set of operations (e.g., filtering, scaling, and so on) is applied across the entire edge, thus making it a challenge to enhance the center of the edges to a great extent without introducing excessive amounts of undershoot and overshoot at the boundaries of the enhanced edges.

Thus, techniques that can provide more enhanced edges in video signals while reducing the amount of undershoots and overshoots are highly desirable.

SUMMARY OF THE INVENTION

The invention provides techniques for enhancing edges in video signals while reducing the amount of undershoots and overshoots. A video signal is processed to generate a first signal that indicates detected edges in the video signal. The first signal can be generated, for example, by lowpass filtering the video signal to generate a lowpass signal and subtracting the lowpass signal from a luminance signal that has been extracted from the video signal. The first signal is then processed with a "non-linear" transfer function, as described below, to generate a second signal having enhanced edges. The second signal is used as the correction or enhancement signal, and is added to the lowpass signal to provide an output signal having enhanced edges with reduced or minimal amounts of undershoots and overshoots.

An embodiment of the invention provides a circuit for enhancing edges in a video signal. The circuit includes a luminance filter, an edge enhancement circuit, and a combiner. The luminance filter receives the video signal and provides a lowpass signal and a first signal that is indicative of detected edges in the video signal. The edge enhancement circuit receives the first signal and provides a second signal that is a non-linear function of the first signal. The combiner receives and combines the lowpass and second signals to provide an output signal having enhanced edges.

The second signal has one or more of the following characteristics: (1) it is dynamically generated based on characteristics of the detected edges in the video signal; (2) it provides varying amounts of enhancement across the detected edges in the video signal; (3) it provides higher amounts of enhancement near the center of the detected edges and smaller amounts of enhancement away from the center; and (4) it provides an amount of enhancement that is dependent on the slope of the detected edges.

The non-linear function can be implemented by processing the first signal to generate a third signal, and to multiply the first signal with the third signal to generate the second signal. In a specific implementation, the non-linear function is achieved by a combination of the following: (1) highpass or bandpass filtering of the first signal; (2) taking the absolute values of the filtered signal; (3) scaling the absolute values with a gain factor; (4) limiting the scaled signal; (5) offsetting the limited signal with an offset factor; (6) coring a version of the first signal; and (7) multiplying the cored signal with the offsetted signal.

The luminance filter can include a two-dimensional filter that can be implemented as a finite impulse response (FIR) filter having an M×N transfer function. The two-dimensional filter can be implemented as a decomposable filter composed of a vertical filter followed by a horizontal filter. The two-dimensional filter can be designed to average three or more (e.g., five) samples in the horizontal direction and two or more video lines in the vertical direction. The video lines can be obtained by delaying the video signal with delay elements having variable delays. These delay elements can also be used to implement a chrominance filter, which is used to extract the chrominance component from the video signal.

Another embodiment of the invention provides a Y/C separator circuit that includes at least one delay element, a luminance filter, an edge enhancement circuit, a combiner, and one or more adder circuits. The delay element(s) receive and delay a video signal, with each delay element providing approximately one horizontal line of delay. The luminance filter receives the video signal and zero or more delayed signals, filters the received signal(s) to provide a lowpass signal, and generates a first signal indicative of detected edges in the video signal. The edge enhancement circuit receives the first signal and provides a second signal that is a non-linear function of the first signal. The combiner receives and combines the lowpass and second signals to provide an output luminance signal having enhanced edges. The adder circuit(s) receive the video signal and one or more delayed signals, combines the received signals, and provides a chrominance signal. The luminance filter and edge enhancement circuit can be designed in similar manners as that described above.

Yet another embodiment of the invention provides a video decoder for decoding a composite video signal. The video decoder includes an input resampler coupled to a Y/C separator. The input resampler receives and resamples input video samples with a first resampling signal to generate resampled video samples that define a resampled signal. The Y/C separator receives and separates the resampled signal into a luminance signal and a chrominance signal. The Y/C separator includes a luminance filter, an edge enhancement circuit, a combiner, and a chrominance filter. The elements of the Y/C separator can be implemented in similar manners as that described above.

Yet another embodiment of the invention provides a method for generating enhanced edges in a video signal. In accordance with the method, the video signal is initially filtered to provide a lowpass signal that is then combined with a luminance signal that has been extracted from the video signal to provide a first signal indicative of detected edges in the video signal. The first signal is processed with a non-linear function to provide a second signal indicative of enhanced edges in the video signal. The lowpass and second signals are combined to provide an output signal having enhanced edges. The second signal has one or more of the characteristics enumerated above.

The non-linear function can be achieved by processing the first signal and combining the processed first signal with a version of the first signal. In a specific implementation, the non-linear function can be achieved by a combination of the following: (1) filtering the first signal to remove low frequency components; (2) taking absolute values of the filtered first signal; (3) scaling the absolute values with a gain factor; (4) limiting the scaled signal; (5) offsetting the limited signal with an offset factor; (6) coring a version of the first signal to remove high frequency noise; and (7) multiplying the cored signal with the offsetted signal to generate the second signal.

The foregoing, together with other aspects of this invention, will become more apparent when refining to the following specification, claims, and accompanying drawings.

BRIEF DESCRIPTION OF THE DRAWINGS

FIG. 2A shows a simplified block diagram of an embodiment of an input resampler;

FIG. 2B shows a block diagram of an embodiment of a section of a control circuit that generates the resampling signal;

DESCRIPTION OF THE SPECIFIC EMBODIMENTS

For simplicity, the invention is described, to a large extent, in conjunction with the NTSC standard and the luminance and chrominance components (Y and C). However, the invention can be applied to other standards including PAL and SECAM. In addition, the invention can be used with other video components.

Figure 1:
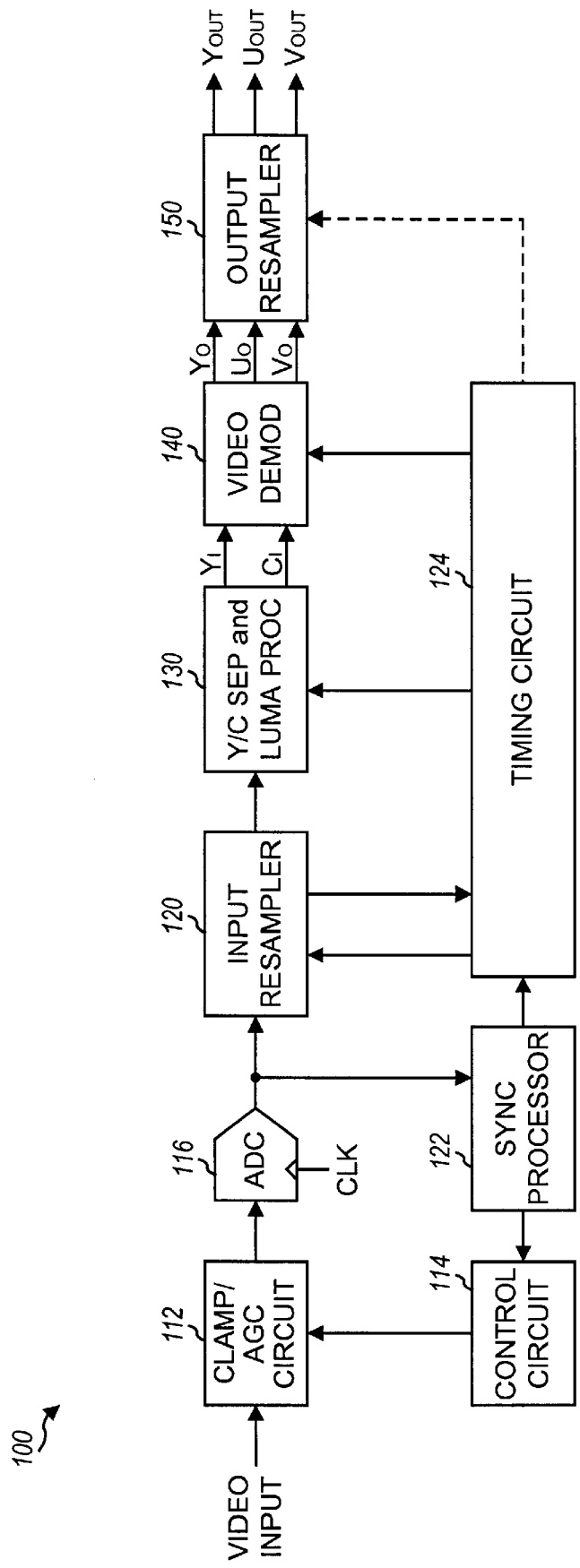
FIG. 1 shows a simplified block diagram of an embodiment of a video decoder.

FIG. 1 shows a simplified block diagram of an embodiment of a video decoder 100. As shown in FIG. 1, the composite video input signal is provided to a clamp/AGC (automatic gain control) circuit 112 that clamps and scales the signal in accordance with a set of control signals from a control circuit 114. The clamped and AGCed signal is provided to an analog-to-digital converter (ADC) 116 that samples the signal with a clock signal CLK having a particular sampling frequency $f_{SAMP}$. The video samples are provided to an input resampler 120 and a sync processor 122.

Resampler 120 resamples the video samples with a first resampling signal from a timing circuit 124 and provides the resampled video samples to a Y/C separator and luminance processor (Y/C SEP and LUMA PROC) 130. Resampling and generation of the signals used for resampling are described in the aforementioned U.S. patent application Ser. No. 09/387,389. The resampled video samples are composite video samples that include both luminance (Y) and chrominance (C) components. Y/C separator and luminance processor 130 separates the luminance and chrominance components from the composite samples, and provides the separated components ($Y_I$ and $C_I$) to a video demodulator (DEMOD) 140. Demodulator 140 further processes the luminance component ($Y_I$), demodulates the chrominance component ($C_I$) into color difference components (e.g., U and V, or I and Q), and provides the processed components (e.g., $Y_O$, $U_O$, and $V_O$) to an output resampler 150. Resampler 150 resamples the components with a second resampling signal from timing circuit 124, as described in the aforementioned U.S. patent application Ser. No. 09/387,389. The resampled components from resampler 150 comprise the output components $Y_{OUT}$, $U_{OUT}$, and $V_{OUT}$. Some of the elements in FIG. 1 are described in further detail below.

In FIG. 1, clamping and scaling are performed on the composite video input signal to provide a processed signal having a proper amplitude and DC level for sampling by ADC 116. This processing ensures that the video signal is not clipped by the ADC. In an embodiment, clamping is achieved by adding an offset (e.g., an offset voltage) to the input video signal such that the blanking level of the clamped video signal is maintained at a first particular level. In an embodiment, AGC is achieved by scaling the clamped video signal such that the sync tip is maintained at a second particular level. Control circuit 114 generates the control signals used for clamping and scaling. Clamping and scaling can also be performed using other techniques, as is known in the art.

In a specific embodiment, the processed video signal is sampled by ADC 116 with a sampling clock having a fixed frequency $f_{SAMP}$. The sampling frequency $f_{SAMP}$ is selected to satisfy the Nyquist criterion, and is at least twice the bandwidth of the processed video signal. In a specific implementation, the sampling frequency is set at approximately 27.0 MHz, although other frequencies can also be used. The sampling frequency can be asynchronous with the line and subcarrier frequencies. For improved decoding performance, the sampling clock is derived from a stable clock source (e.g., a voltage controlled crystal oscillator (VCXO), a PLL locked to a stable clock, or other sources) to provide low-jitter video samples for standard and non-standard input video signals.

Sync processor 122 detects the horizontal and vertical synchronizing pulses in the video signal and generates horizontal and vertical (H/V) sync signals indicative of the detected sync pulses. These sync signals are used by other circuits for timing, synchronization, and control, as described below. An implementation of sync processor is described in the aforementioned U.S. patent application Ser. No. 09/387,389.

FIG. 2A shows a simplified block diagram of an embodiment of input resampler 120. Resampler 120 receives video samples at the sample rate $f_{SAMP}$ and generates resampled video samples at a first resampled rate $f_{R1}$. In an embodiment, the resampling frequency $f_{R1}$ is related to the subcarrier frequency, or $f_{R1}=m \cdot f_{SC}$, where m is an integer greater than two. By selecting a resampling frequency that is related to the subcarrier frequency by an integer, the resampled video samples can be more easily demodulated, as described below. Color demodulation is simplified when m is an even integer, and is preferably four. Input resampler 120 effectively implements a burst-lock front end for the video decoder.

As shown in FIG. 2A, the video samples from ADC 116 are provided to an (optional) anti-aliasing filter 210 within resampler 120. Filter 210 is a lowpass filter that removes high frequency components to prevent aliasing during resampling. The video samples include spectral components from DC to $0.5 \cdot f_{SAMP}$. When the resampling frequency is lower than the sampling frequency, the higher spectral components alias and fold inband during resampling. For example, if the resampling frequency is four times the subcarrier frequency, or $f_{R1}=4 \ f_{SC}=14.318$ MHz, and the sampling frequency $f_{SAMP}=27.0$ MHz, the spectral portion from 7.159 MHz to 13.5 MHz aliases during resampling. This spectral portion would constitute noise in the resampled video signal. Filter 210 removes the spectral portion that can alias during resampling, and its bandwidth BW is selected based, in part, on the resampling frequency, or $BW<f_{R1}/2$.

The filtered samples are provided to a resampling circuit 212. In a specific embodiment, resampling circuit 212 is a linear interpolator that generates (or interpolates) samples at the resampling rate $f_{R1}$. Each interpolated sample y[i] is based on two filtered samples x[i] and x[i+1] and a phase difference k[n] between the resampling signal and the ADC sampling clock for that particular sample y[i]. Resampling circuit 212 can also be implemented using third and higher order interpolators, or with other resampling architectures, and this is within the scope of the invention.

Linear and higher order interpolation is further described in two papers entitled "Interpolation in Digital Modems—Part I: Fundamentals," by Floyd M Gardner, IEEE Transactions on Communications, Vol. 41, No. 6, June 1993, and "Interpolation in Digital Modems—Part II: Implementation and Performance," by Floyd M Gardner, IEEE Transactions on Communications, Vol. 41, No. 3, March 1993, both of which are incorporated herein by reference. A graphical description of the resampling process is included in the aforementioned U.S. patent application Ser. No. 09/387,389.

A subcarrier PLL 220 generates a timing signal used for resampling. PLL 220 receives the horizontal and vertical sync signals (H/V SYNC) from sync processor 122 and the resampled video samples from resampling circuit 212. In an embodiment, PLL 220 includes a numerically controlled oscillator (NCO) that generates a synthesized clock signal based, in part, on a stable clock signal (e.g., the ADC sampling clock CLK). The frequency of the clock signal from PLL 220 is phased locked to the color bursts in the input video signal. Implementation of PLL 220 is further described below.

The H/V SYNC signals are used by PLL 220 to generate windows during which detection of color bursts is enabled. As noted above, the color burst typically begins a particular time period after the falling edge of the horizontal sync signal. The H/V SYNC signals are also used by PLL 220 to enable the PLL dulling time intervals when valid color bursts are detected.

A control circuit 222 provides the resampling signal to resampling circuit 212. The resampling signal is dependent on the timing signal from PLL 220, and may be further dependent on a phase offset value (e.g., provided by the user). The phase offset value allows the user to change the tint of the decoded picture. For an embodiment in which the resampling circuit is implemented with an interpolator, the resampling signal determines the weighting factor for each of the samples used to generate the interpolated (or resampled) sample.

FIG. 2B shows a block diagram of an embodiment of a section of control circuit 222 that generates the resampling signal. A summer 252 receives the output from PLL 220 and the phase offset value, combines the two received inputs, and provides the result to one input of an AND gate 254. In an embodiment, a control logic 256 receives the H/V SYNC signals, generates a window that is logic high for the duration of each active video line except during the sync pulse, and provides the window to the other input of AND gate 254. AND gate 254 generates the resampling signal based on the two inputs. Thus, in an embodiment, the color bursts and active video portion, but not the sync pulse, are resampled. This feature can be particularly advantageous for providing 1024 samples (instead of 1135 samples) for each PAL video line, which can reduce the memory requirement to 1 K byte for each active video line.

In an embodiment, control circuit 222 further includes circuitry (not shown in FIG. 2B) that computes, for each active video line, a time difference between the start of the video line (e.g., which is defined as the falling edge of the horizontal sync pulse) and the color burst phase. The color burst phase can be determined as the phase of the first resampled video sample in the video line after the falling edge of the horizontal sync pulse, as described in the aforementioned U.S. patent application Ser. No. 09/387,389. This time difference represents the misalignment in the picture, which is typically more pronounced for a non-standard video signal. The time difference is provided to output resampler 150 for adjustment and alignment of the picture.

The circuitry used to implement input resampler 120 is known in the art and not described in detail herein. In actual circuit implementations, the resampling signal is typically synthesized from another clock signal (e.g., the ADC clock signal CLK). The ADC clock signal may thus be used to provide both the ADC samples and the resampled video samples. Since the resampling frequency is typically less than the ADC sampling frequency ($f_{R1} < f_{SAMP}$), some periods of the clock signal CLK will not be associated with valid resampled video samples. The circuit implementation details to process samples at "virtual" resampling rates based another clock signal (e.g., the ADC clock signal CLK) are known in the art and not described herein.

The resampled video samples from input resampler 120 are "composite" samples that include both luminance (Y) and chrominance (C) components. Y/C separator and luminance processor 130 receives and separates the composite samples into luminance and chrominance samples.

Figure 3A:
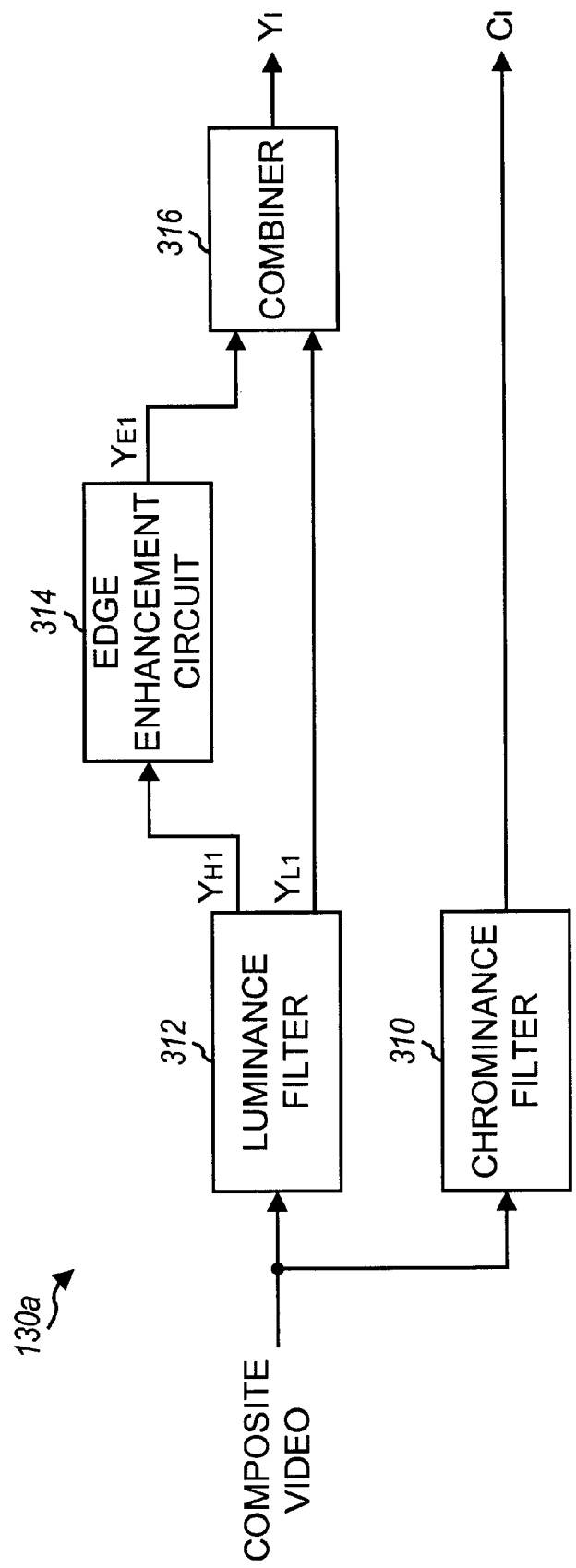
FIGS. 3A and 3B show simplified block diagrams of two specific embodiments of a Y/C separator and luminance processor.

FIG. 3A shows a simplified block diagram of a specific embodiment of a Y/C separator and luminance processor 130a. The composite video signal (i.e., the resampled video samples) is provided to a chrominance filter 310 and a luminance filter 312. Chrominance filter 310 extracts the chrominance signal $C_I$ from the composite video signal, as described below.

Luminance filter 312 performs several functions to assist in the generation of an output luminance signal $Y_I$ having enhanced edges. Luminance filter 312 extracts the luminance signal $Y_C$ from the composite video signal S1, as described below. Luminance filter 312 also filters the composite video signal and provides a lowpass filtered signal $Y_{L1}$ to a combiner 316. Luminance filter 312 further detects edges in the composite video signal and provides a signal $Y_{H1}$ indicative of the detected edges. In a specific embodiment, the signal $Y_{H1}$ is generated by subtracting the lowpass signal $Y_{L1}$ from the extracted luminance signal $Y_C$ (i.e., $Y_{H1} = Y_C - Y_{L1}$). The signal $Y_{H1}$ is provided to an edge enhancement circuit 314 that enhances the detected edges in the luminance signal and provides a signal $Y_{E1}$ indicative of the enhanced edges. In an embodiment, the signal $Y_{E1}$ is a non-linear function of the signal $Y_{H1}$, or is dynamically generated based on characteristics of the detected edges, as described in further detail below. The signal $Y_{E1}$ is provided to combiner 316 and combined with the lowpass signal $Y_{L1}$ to provide the output luminance signal $Y_I$ having enhanced edges. Each of the elements shown in FIG. 3A is described in further detail below.

Luminance filter 312 provides the appropriate filtering to remove the chrominance component from the composite video signal. The signal $Y_{L1}$ tends to include low frequency components, and the signal $Y_{H1}$ tends to include high frequency components.

Figure 3B:
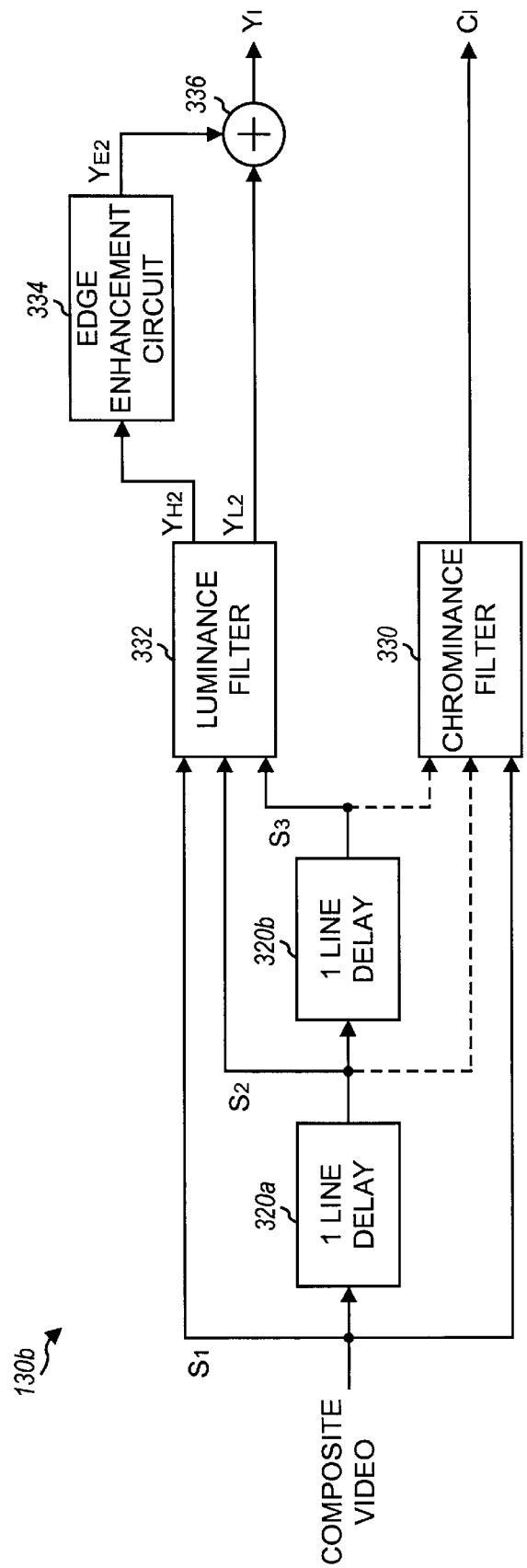

FIG. 3B shows a simplified block diagram of a specific embodiment of a Y/C separator and luminance processor 130b. The composite video signal is provided to a delay element 320a and further to a delay element 320b. Each delay element 320 provides one horizontal line of delay which, in an embodiment, is a variable amount of delay for non-standard video signals. In an embodiment, the amount of delay is approximately (m·n+m/2) samples for NTSC decoding and (m·n+3m/4) samples for PAL decoding, with m and n being integers selected in a manner described below. In a specific embodiment, for an NTSC signal that is sampled at four times the subcarrier frequency, m=4, n=227, and delay element 320 provides (4n+2) samples of delay. The composite video signal and the delayed signals from delay elements 320a and 320b (comprising the video signals S1, S2, and S3, respectively, as shown in FIG. 3B) are provided to a luminance filter 332. The composite video signal is also provided to a chrominance filter 330, which may also receive the signals S2 and S3, depending on the particular implementation of the chrominance filter. Chrominance filter 330 extracts the chrominance signal $C_I$ from the composite video signal.

Luminance Filter 332 extracts the luminance signal $Y_C$ from the composite video signal. In an embodiment, luminance filter 332 includes a 2-dimensional (2-D) lowpass filter that performs two-dimensional filtering of the composite video signal and provides a lowpass filtered signal $Y_{L2}$ to a summer 336. Luminance filter 332 also detects edges in the composite video signal and provides a signal $Y_{H2}$ indicative of the detected edges. In a specific embodiment, the signal $Y_{H2}$ is generated by subtracting the lowpass signal $Y_{L2}$ from the extracted luminance signal $Y_C$ (i.e., $Y_{H2} = Y_C - Y_{L2}$).

The signal $Y_{H2}$ is provided to an edge enhancement circuit 334 that enhances the detected edges in the luminance signal and provides a signal $Y_{E2}$ indicative of the enhanced edges to summer 336. In an embodiment, the signal $Y_{E2}$ is a non-linear function of the signal $Y_{H2}$, or is dynamically generated based on characteristics of the detected edges, as described in further detail below. Summer 336 combines the lowpass signal $Y_{L2}$ with the signal $Y_{E2}$ to provide an output luminance signal $Y_I$ having enhanced edges. Chrominance filter 330, luminance filter 332, and edge enhancement circuit 334 are described in further detail below.

Figure 4:
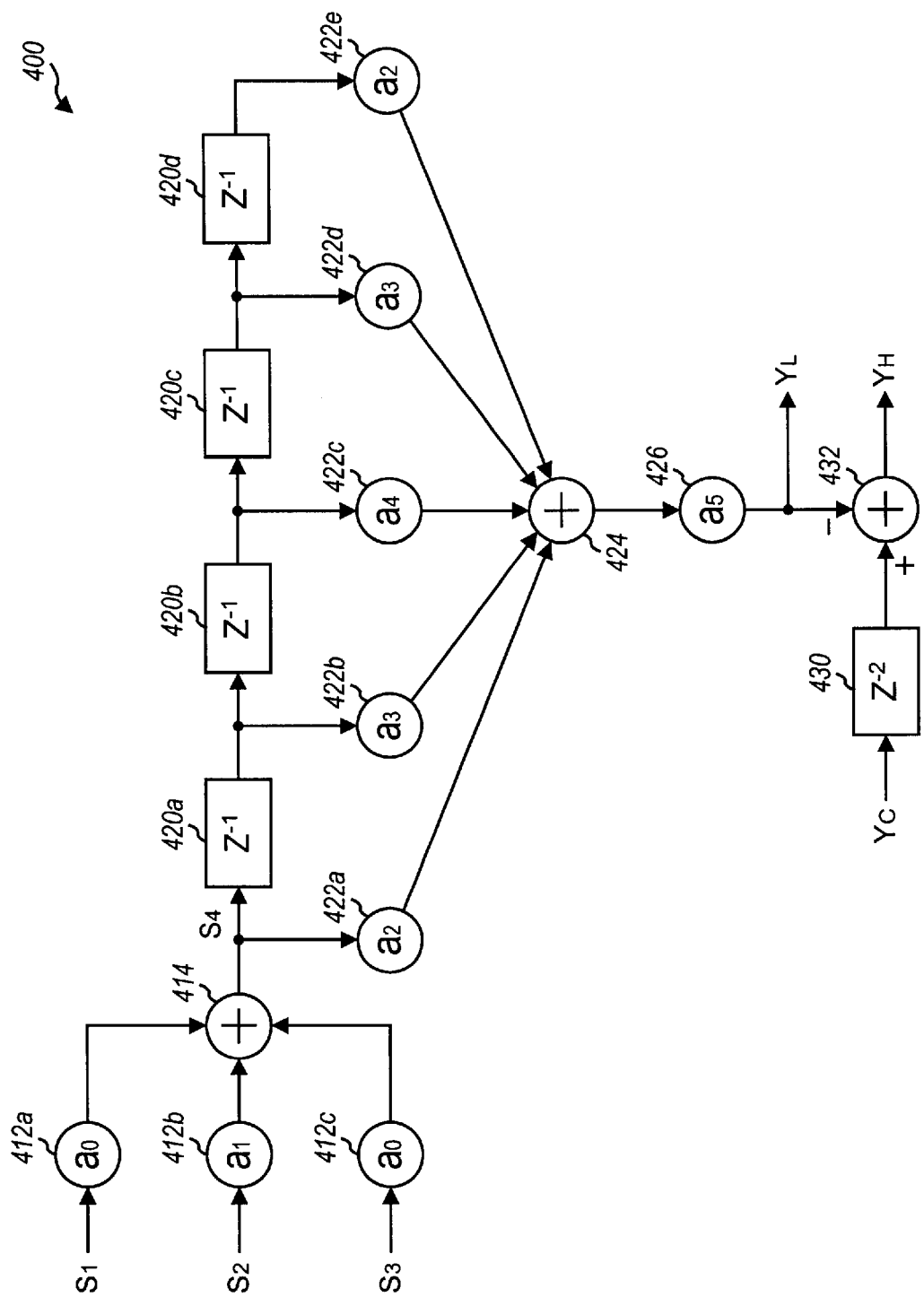
FIG. 4 shows a diagram of a specific embodiment of a luminance filter.

FIG. 4 shows a diagram of a specific embodiment of a 2-D lowpass filter 400 that can be used to implement luminance filter 312 in FIG. 3A and luminance filter 332 in FIG. 3B. The video signals S1, S2, and S3 are provided to scaling elements 412a, 412b, and 412c, respectively. Each scaling element 412 scales the respective input signal by a gain factor (e.g., $a_0$, or $a_1$) and provides the scaled signal to a summer 414. Summer 414 sums the three input signals and provides the combined signal S4 to a delay element 420a that further couples in series with delay elements 420b, 420c, and 420d. Each delay element 420 provides a delay of one sample, as denoted by the designation $Z^{-1}$. For a video signal that has been resampled to a new resampling frequency $f_{R1}$, each delay element 420 provides a delay of $T_{R1}$, where $T_{R1} = 1/f_{R1}$.

The signals from summer 414 and delay elements 420a through 420d are provided to scaling elements 422a through 422e, respectively. Each scaling element 422 scales the respective input signal with a respective gain factor (e.g., $a_2$, $a_3$, or $a_4$) and provides the scaled signal to a summer 424. Summer 424 sums the five input signals and provides the combined signal to a scaling element 426. Scaling element 426 scales the input signal with a gain factor $a_5$ and provides the lowpass signal $Y_L$.

The signals S1, S2, and S3 represent signals from three consecutive lines of video (e.g., the composite video signal). Thus, scaling elements 412a through 412c and summer 414 comprise a three tap finite impulse response (FIR) filter for the vertical direction of the video. Delay elements 420, scaling elements 422, and summer 424 comprise a five tap FIR filter for the horizontal direction. Scaling element 426 scales the filtered signal such that the overall filter gain is maintained at 1.0.

The extracted luminance signal $Y_C$ is also provided to a delay element 430 that provides two samples of delay, to match the delay of the lowpass signal $Y_L$. The delayed signal from delay element 430 is provided to a summer 432, which subtracts from the lowpass signal $Y_L$ from the delayed signal to provide the signal $Y_H$ indicative of the detected edge.

In a specific embodiment, for ease of implementation, the gain factors $a_0$ and $a_2$ are selected to be one-half, the gain factors $a_1$, $a_3$, and $a_4$ are selected to be one, and the gain factor $a_5$ is selected to be one-eight. With these coefficients, 2-D lowpass filter 400 has the following transfer function:

$$\frac{\begin{array}{ccccc} 1/4 & 1/2 & 1/2 & 1/2 & 1/4 \\ 1/2 & 1 & 1 & 1 & 1/2 \\ 1/4 & 1/2 & 1/2 & 1/2 & 1/4 \end{array}}{8}$$

Referring back to FIG. 3B, luminance filter 332 receives the composite video signal S1 and its delayed versions S2 and S3. In an embodiment, each delay element 320 provides a variable amount of delay Such that the chrominance signals on alternate video lines are 180 degrees out-of-phase. Thus, the taps of the vertical FIR filter (e.g., $a_0$ and $a_1$) are selected such that the vertical chrominance component approximately cancels out, leaving the filtered vertical luminance component. For a composite video signal that has been resampled at four times the color subcarrier frequency, alternate samples within a particular video line are 180 degrees out-of-phase. The taps of the horizontal FIR filter (e.g., $a_2$, $a_3$, and $a_4$) are selected such that the horizontal chrominance component approximately cancels out, leaving the filtered horizontal luminance component.

As shown in FIG. 4, for simplicity, 2-D lowpass filter 400 is implemented as a "decomposable" 2-D filter composed of a vertical lowpass filter followed by a horizontal lowpass filter. The decomposable filter simplifies the design, reduces the hardware requirement (e.g., the number of required gates), and also reduces the number of computations.

In general, 2-D lowpass filter 400 can be designed using various filter topologies and various filter orders. 2-D lowpass filter 400 can be implemented as an M×N filter, where M and N represent the filter orders in the vertical and horizontal directions, respectively, and M and N can each be a value of one or greater. For example, M can be 1, 2, 4, 5, or greater, and N can be greater or less than 5. 2-D lowpass filter 400 can also be implemented using an infinite impulse response (IIR) filter, or other filter topologies.

In accordance with the NTSC standard, the color subcarrier frequency $f_{SC}$ (NTSC) is related to the line frequency $f_H$ by the following:

$$f_{SC}(\text{NTSC})=227.5f_H \text{ or } 4f_{SC}=910f_H. \qquad \text{Eq. (1)}$$

As shown by the first half of equation (1), for an NTSC-compliant video signal, there are 227.5 color burst cycles per horizontal line, and the color bursts are 180° out-of-phase between consecutive video lines. Thus, by delaying the samples by one video line and adding samples of the current line with the delayed samples of an immediately preceding line, the chrominance component approximately cancels out and the luminance component is obtained. Similarly, by subtracting samples of the current line from delayed samples of the immediately preceding line, the luminance approximately cancels out and the chrominance component is obtained.

In accordance with the PAL standard, the color subcarrier frequency $f_{SC}$ (PAL) is related to the line frequency $f_H$ by the following:

$$f_{SC}(\text{PAL})=283.75f_H \text{ or } 4f_{SC}=1135f_H. \qquad \text{Eq. (2)}$$

As shown by the first half of equation (2), for a PAL-compliant video signal, there are 283.75 color burst cycles per horizontal line, and the color bursts are 90° out-of-phase between consecutive video lines. Thus, by delaying the samples by one video line and plus-or-minus one sample period, and adding samples of the current line with the appropriately delayed samples of an immediately preceding line, the chrominance component approximately cancels out and the luminance component is obtained. Similarly, by subtracting samples of the current line from the appropriately delayed samples of the immediately preceding line, the luminance approximately cancels out and the chrominance component is obtained.

Figure 5A:
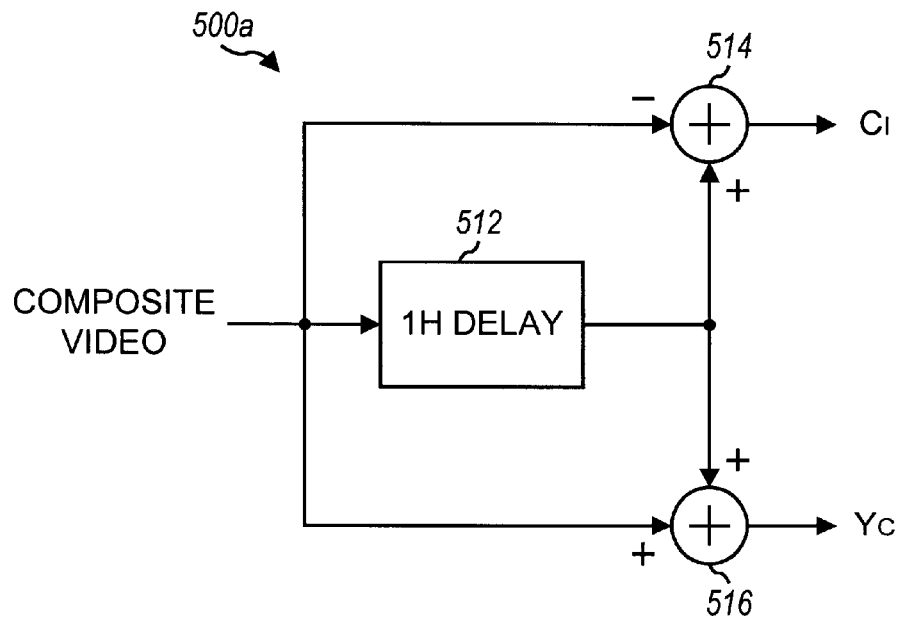
FIGS. 5A through 5C show block diagrams of three embodiment of a comb filter that can be used for Y/C separation.

FIG. 5A shows a block diagram of an embodiment of a comb filter 500a that can be used for Y/C separation. The composite video signal (i.e., the signal S1) is provided to a delay element 512 and summers 514 and 516. Delay element 512 provides one horizontal line of delay which, in this embodiment, is a fixed number of samples or a fixed time period. For example, for an NTSC-compliant signal that is sampled at four times the subcarrier frequency, delay element 512 provides 910 samples of delay. The composite video signal is subtracted from the delayed signal by summer 514 to provide the chrominance signal $C_I$, and the composite video signal is added to the delayed signal by summer 516 to provide the luminance signal $Y_C$.

As noted above, for non-standard video signals such as those from VCRs, the line duration can vary from line to line. When the video line is sampled with a burst-lock architecture, such as that performed by input resampler 120, each non-standard video line can include any number of samples.

Figure 5B:
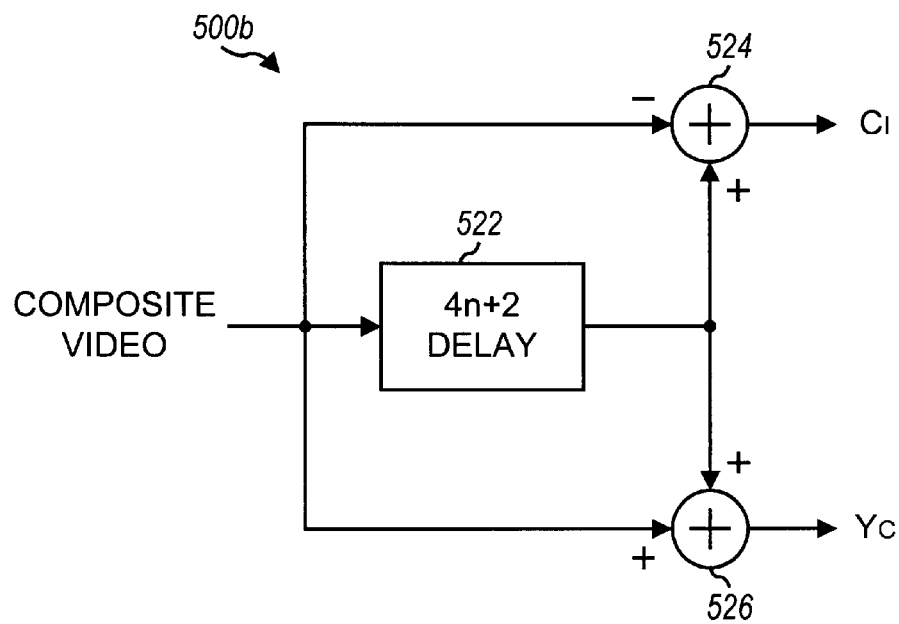

FIG. 5B shows a block diagram of an embodiment of a comb filter 500b that can also be used for Y/C separation. The composite video signal (i.e., the signal S1) is provided to a delay element 522 and summers 524 and 526. For NTSC decoding, delay element 522 provides (m·n+m/2) samples of delay, where m is the ratio of the frequencies of the resampling signal and the color subcarrier (i.e., $m=f_{R1}/f_{SC}$) and n is an integer. In an embodiment, for an NTSC-compliant signal that is sampled at four times the subcarrier frequency, m=4, n=227, and delay element 522 provides (4n+2) or 910 samples of delay. However, when decoding a non-standard video signal, n is selected to be an integer such that (m·n+m/2) most approximates the duration of the line. The line duration can be determined from the detected horizontal sync pulse at the start of each video line.

For PAL decoding, delay element 522 provides (m·n+3m/4) samples of delay. In an embodiment, for a PAL-compliant signal that is sampled at four times the subcarrier frequency, m=4, n=283, and delay element 522 provides (4n+3) or 1135 samples of delay.

Comb filter 500b can provide a better approximation of the luminance and chrominance components for non-standard video signals than comb filter 500a. Comb filter 500b provides a variable amount of delay that is based on the actual duration of the video line. The delay provided by comb filter 500b has at most ±2 samples of error from the actual video line length, and this error can be much less than that of a comb filter having a fixed number of samples of delay. Since most non-standard video signals have line duration that varies slowly from line to line the ±2 samples of error is tolerable, or not objectionable, in most instances.

Figure 5C:
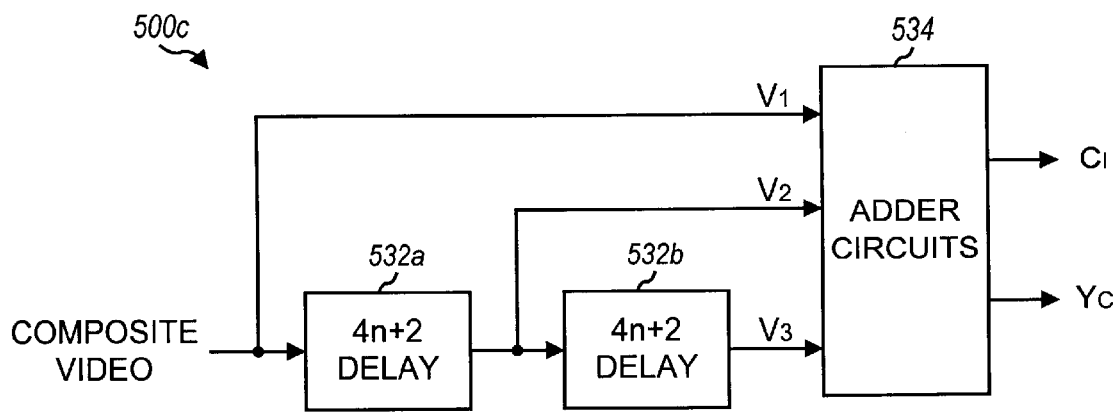

FIG. 5C shows a block diagram of an embodiment of an adaptive comb filter 500c that provides improved performance for Y/C separation. Adaptive comb filter 500c includes delay elements 532a and 532b having variable amounts of delay. The composite video signal is provided to delay element 532a and further to delay element 532b. In an embodiment, each delay element 532 provides (m·n+m/2) samples of delay for NTSC decoding and (m·n+3m/4) samples of delay for PAL decoding, with m and n being integers selected in similar manner as for comb filter 500b. For an NTSC signal that is sampled at four times the subcarrier frequency, m=4, n=227, and each delay element 532 provides (4n+2) samples of delay. The composite video signal and the delayed signals from delay elements 532a and 532b (comprising the video signals V1, V2, and V3, respectively) are provided to adder circuits 534 that appropriately combine the signals to generate the luminance signal $Y_C$ and the chrominance signal $C_f$.

Figure 5D:
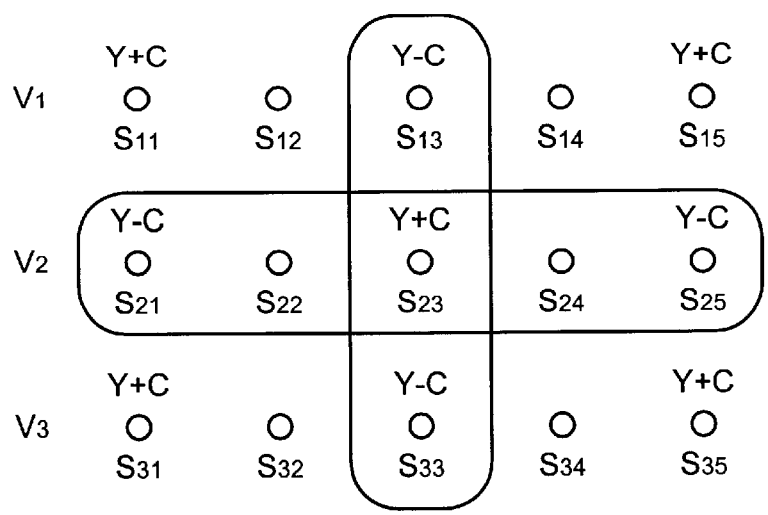
FIG. 5D shows a representation of the samples from the video signals V1, V2, and V3 used by the adaptive comb filter in FIG. 5C.

FIG. 5D shows a representation of the samples from the video signals V1, V2, and V3. The video signal V1 includes a sequence of video samples labeled as $S_{11}$, $S_{12}$, $S_{13}$, $S_{14}$, $S_{15}$, and so on, the video signal V2 includes a sequence of video samples labeled as $S_{21}$, $S_{22}$, $S_{23}$, $S_{24}$, $S_{25}$, and so on, and the video signal V3 includes a sequence of video samples labeled as $S_{31}$, $S_{32}$, $S_{33}$, $S_{34}$, $S_{35}$, and so on. For an NTSC signal, the video signals in adjacent lines are 180° out-of-phase. Also, when the NTSC signal is sampled at four times the subcarrier frequency, each sample is 90° out-of-phase with respect to the adjacent samples on the same video line. Horizontal comb filtering can be achieved as follows:

$C_f=(2S_{23}-S_{21}-S_{25})/4$, and $Y_C=S_{23}-C_f$. Eq. (3)

Similarly, vertical comb filtering can be achieved as follows:

$C_f=(2S_{23}-S_{13}-S_{33})/4$, and $Y_C=S_{23}-C_f$. Eq. (4)

Adder circuits 534 perform the computations shown by equation (3) or (4) depending on whether horizontal or vertical comb filtering is selected.

Adaptive comb filter 500c can provide improved Y/C separation with small cross-coupling of the luminance component to the separated chrominance component, and vice versa, at both horizontal and vertical edges. Horizontal (or vertical) adaptive comb filtering can provide improved performance when a horizontal (or vertical) line exists in the video picture. In a simple implementation, the selection between horizontal and vertical comb filtering is achieved by detecting the amount of change in the amplitude of the samples in the vertical and horizontal directions. For example, vertical comb filtering can be performed if the amplitude difference in the vertical direction is less than the amplitude difference in the horizontal direction, as shown by the following:

$|S_{13}-S_{33}|<|S_{21}-S_{25}|$. Eq. (5)

The amplitude difference expressed by equation (5) is a simple criterion shown for illustration. Other criteria can also be used to select the comb filtering mode and are within the scope of the invention. For example, criteria can be selected to better detect diagonal lines in the video picture.

FIG. 5C shows a simple embodiment of an adaptive comb filter that advantageously employs a variable delay. Specifically, the adaptive comb filter provides improved performance when the line delay is allowed to vary such that the adjacent video lines are approximately 180° out-of-phase. Other types and implementations of adaptive comb filters can also be designed and are within the scope of the invention. For example, another adaptive comb filter that can be used for Y/C separation is disclosed in U.S. Pat. No. 5,220,414, which is incorporated herein by reference.

Each of comb filters 500a, 500b, and 500c can be used to implement: (1) chrominance filter 310 and the luminance extraction portion of luminance filter 312 in FIG. 3A, or (2) chrominance filter 330 and the luminance extraction portion of luminance filter 332 in FIG. 3B. Y/C separator and luminance processor 130b in FIG. 3B includes two delay elements 320a and 320b that are used to provide two lines of delay for the 2-D lowpass filtering. These delay elements can be used to implement the delay element(s) in comb filters 500a, 500b, and 500c.

For example, delay element 512 in comb filter 500a can be implemented with either delay element 320a or 320b in Y/C separator and luminance processor 130b. Summers 514 and 516 then receive the signals S1 and S2, respectively (or the signals S2 and S3). Summer 514 implements chrominance filter 310 or 330, and summer 516 implements the luminance extraction portion of luminance filter 312 or 332.

Similarly, delay element 522 in comb filter 500b can be implemented with either delay element 320a or 320b. For comb filter 500c, delay elements 532a and 532b can be implemented with delay elements 320a and 320b, and the signals S1, S2, and S3 (which correspond to the signals V1, V2, and V3, respectively) are provided to adder circuits 534. Adder circuits 534 implement the chrominance filter and the luminance extraction portion of the luminance filter.

Referring back to FIG. 3B, lowpass filtering is performed on the composite video signal S1 and its delayed versions S2 and S3 (and not on a luminance signal extracted from the composite video signal, as is the case for many conventional edge enhancement circuits). This allows for the sharing of delay elements 320a and 320b between chrominance filter 330 and luminance filter 332. In fact, since at least one delay element is typically used to implement chrominance filter 330, the delay element(s) for luminance filter 332 are practically obtained for free, without the need for additional memory for buffering. The design shown in FIG. 3B can thus provide improved performance while using minimal additional hardware.

Figure 6:
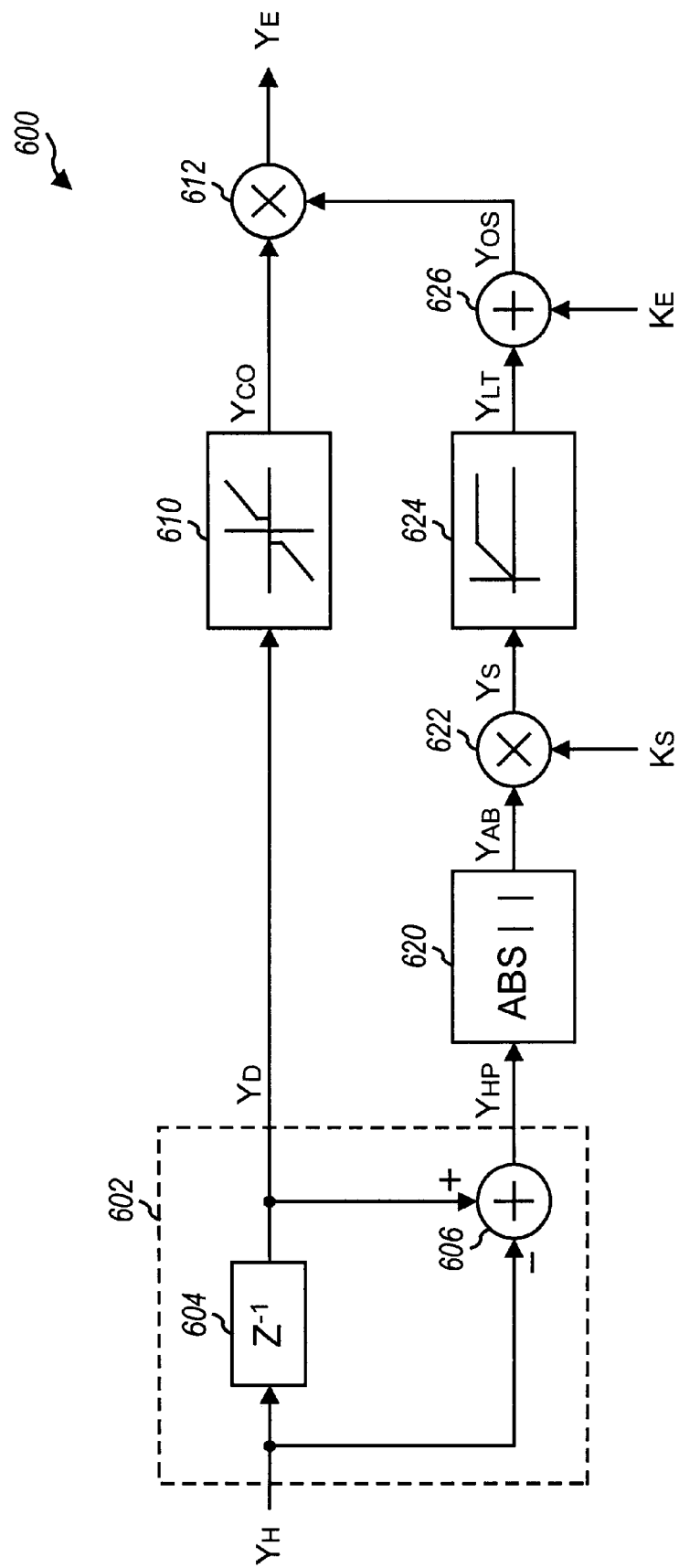
FIG. 6 shows a block diagram of a specific embodiment of an edge enhancement circuit.

FIG. 6 shows a block diagram of a specific embodiment of an edge enhancement circuit 600. Edge enhancement circuit 600 can be used to implement edge enhancement circuit 314 in FIG. 3A or edge enhancement circuit 334 in FIG. 3B. Within edge enhancement circuit 600, the signal $Y_H$ indicative of the detected edges in the luminance signal is provided to an input filter 602 that provides a highpass or bandpass signal $Y_{HP}$ and a delayed signal $Y_D$.

The delayed signal $Y_D$ is provided to a coring circuit 610 that "cores" the signal $Y_D$ with a particular transfer function and provides the cored signal $Y_{CO}$ to a multiplier 612. In an embodiment, coring circuit 610 implements the following transfer function:

$$Y_{CO} = \begin{cases} Y_D & |Y_D| \geq V_{TH} \\ 0 & |Y_D| < V_{TH} \end{cases}, \quad \text{Eq. (6)}$$

where $V_{TH}$ is a particular threshold value.

Coring circuit 610 provides an output signal $Y_{CO}$ that is a function of the input signal $Y_D$. If the magnitude of the input signal $Y_D$ is less than the threshold value $V_{TH}$, the output is set to zero. Otherwise, if the magnitude of the input signal $Y_D$ is equal to or greater than the threshold value $V_{TH}$, the output is set to the input. This transfer function suppresses high frequency noise in the input signal, which typically manifests itself as small chances in the signal amplitude. However, a luminance edge having a larger amplitude is passed by coring circuit 610 with minimal changes.

In an embodiment, input filter 602 is implemented as a first order differential circuit that includes a delay element 604 and a summer 606. Delay element 604 receives and delays the signal $Y_H$ by one sample and provides the delayed signal $Y_D$ to summer 606. Summer 606 also receives and subtracts the signal $Y_H$ from the delayed signal $Y_D$ and provides a signal $Y_{HP}$ that includes high frequency components. The frequency response of the differential circuit is known in the art and not described herein. The signal $Y_{HP}$ has higher amplitudes near the center of a detected edge and lower amplitudes away from the edge center. The signal $Y_{HP}$ is then provided to an absolute element 620 that generates absolute values of the signal $Y_{HP}$ by inverting the negative portion of the signal $Y_{HP}$. The signal $Y_{AB}$ from absolute element 620 is indicative of the magnitude of the slope of the edges.

The absolute signal $Y_{AB}$ is provided to a scaling element 622 that scales the signal with a gain factor $K_S$. The scaled signal $Y_S$ is provided to a limiter 624 that limits (or clips) the signal to a particular peak amplitude value. The limited signal $Y_{LT}$ is provided to a summer 626 that combines the signal $Y_{LT}$ with an offset factor $K_E$. The offsetted signal $Y_{OS}$ is provided to multiplier 612 and multiplied with the cored signal $Y_{CO}$ to generate the signal $Y_E$ indicative of the enhanced luminance edges.

The sharpness of the edges can be controlled by adjusting the gain factor $K_S$ and the offset factor $K_E$. The gain factor $K_S$ determines the strength of the edge enhancement. Larger values for $K_S$ provide proportionally larger amounts of enhancement for the detected edges. The offset factor $K_E$ controls the sharpness of the edges in the output luminance signal $Y_I$ (i.e., $K_E$ acts as the sharpness control). When $K_E$ is set to less than 1.0, the luminance edges typically become more blurry and less sharp. Alternatively, when $K_E$ is set to greater than 1.0, the luminance edges typically become more sharp and crisp. The default value for $K_E$ can be 1.0, or some other values that can be empirically determined. $K_S$ and/or $K_E$ can also be adjustable (e.g., by a user).

Edge enhancement circuit 600 provides edge enhancement via a non-linear transfer function of the input signal $Y_H$. Edge enhancement circuit 600 receives the signal $Y_H$ indicative of the detected luminance edges and enhances the edges such that the output luminance signal $Y_I$ has sharper edges. Edge enhancement circuit 600 can also be designed or adjusted to provide more blurry edges, which may be more desirable in some applications.

In an embodiment, the output signal from edge enhancement circuit 600 has one or more of the following characteristics: (1) it is dynamically generated based on characteristics of the detected edges in the video signal; (2) it provides varying amounts of enhancement across the detected edges in the video signal; (3) it provides higher amounts of enhancement near the center of the detected edges and smaller amounts of enhancement away from the center; (4) it provides an amount of enhancement that is dependent on the slope of the detected edges; and other characteristics.

FIG. 6 shows a specific embodiment of the edge enhancement circuit. Various modifications can be made to the edge enhancement circuit, and this is within the scope of the invention. For example, the differential circuit can be replaced with a highpass filter, a bandpass filter, or some other filters that can be used to detect edges in a signal. Some of the elements in FIG. 6 can also be removed or replaced. For example, coring circuit 610, absolute circuit 620, scaling element 622, limiter 624, or summer 626, or a combination thereof, can be removed from edge enhancement circuit 600. In edge enhancement circuit 600, the non-linear transfer function used for edge enhancement is implemented by processing the input signal $Y_H$ through one signal path (comprised of input filter 602 through summer 626), and multiplying the processed signal with a delayed version of the input signal $Y_H$.

Figure 7A:
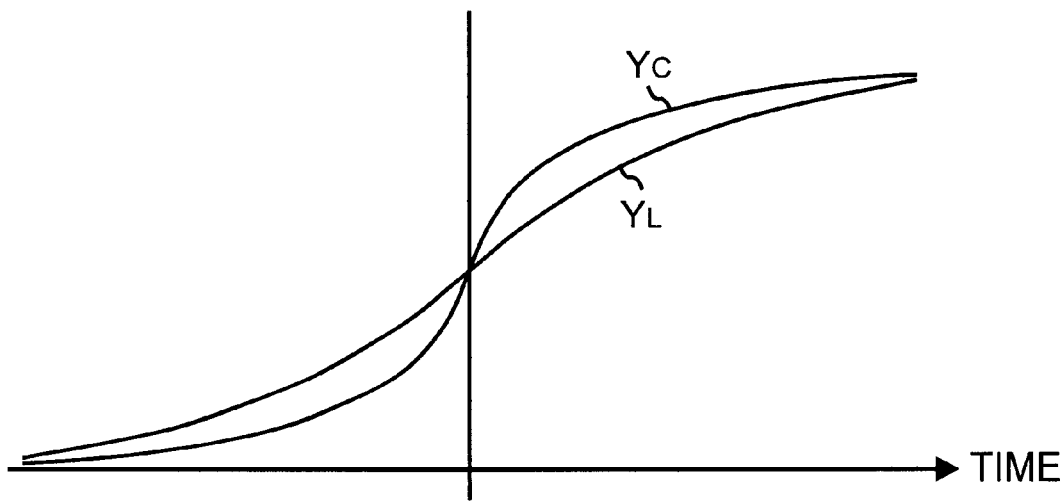
FIGS. 7A through 7D are plots that illustrate the operation of the edge enhancement circuit in FIG. 6.

FIGS. 7A through 7D are plots that illustrate the operation of edge enhancement circuit 600. FIG. 7A shows plots of the luminance signal $Y_C$ extracted from the composite video signal S1 and the lowpass signal $Y_L$ from the luminance filter (e.g., luminance filter 312 in FIG. 3A or luminance filter 334 in FIG. 3B) for a particular luminance edge. Because of the lowpass filtering, the edge of the signal $Y_L$ is more gradual than that of the signal $Y_C$.

Figure 7B:
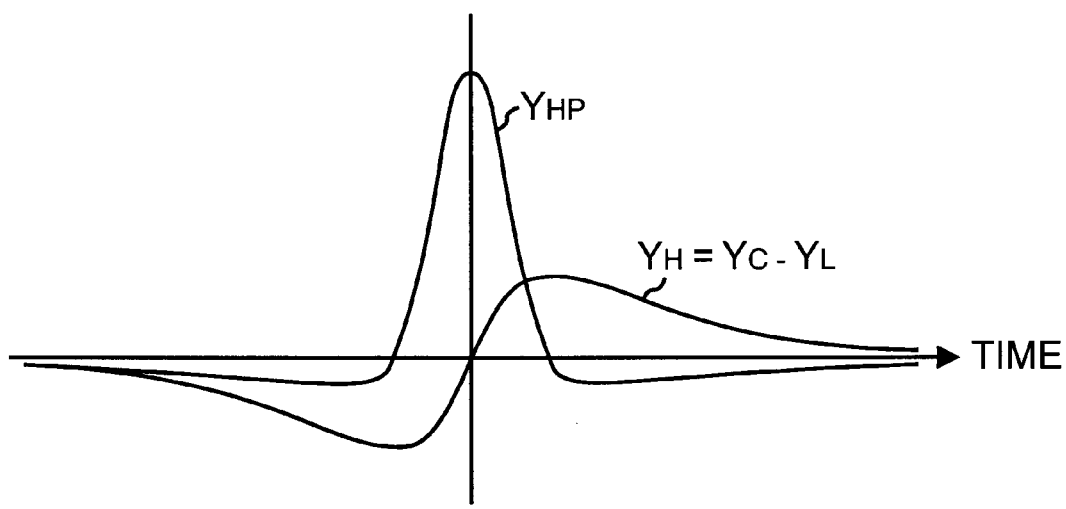

FIG. 7B shows plots of the signal $Y_H$ indicative of the detected edge and the signal $Y_{HP}$ having higher amplitudes near the center of the detected edge and lower amplitudes away from the edge center. In an embodiment, the signal $Y_H$ is obtained by subtracting the lowpass signal $Y_L$ from the luminance signal $Y_C$. The signal $Y_H$ is zero at the center of the edge, a positive value to the right of the center of the edge (since the luminance signal $Y_C$ is greater than the lowpass signal $Y_L$), and a negative value to the left of the edge center (since the luminance signal $Y_C$ is less than the lowpass signal $Y_L$).

The differential circuit in FIG. 6 (comprised of delay element 604 and summer 606) detects the slope of the lowpass signal $Y_H$ and provides the highpass signal $Y_{HP}$ having amplitudes that vary across the detected edges. As shown in FIG. 7B, the signal $Y_{HP}$ has: (1) a largest value at the center of the edge, (2) a value of zero when the signal $Y_H$ is at a maximum or minimum value, (3) a positive value when the slope of the signal $Y_H$ is positive (e.g., increasing in amplitude), and (4) a negative value when the slope of the signal $Y_H$ is negative (e.g., decreasing in amplitude). Because of the delay introduced by delay element 604, the signal $Y_{HP}$ is temporally aligned with the signal $Y_D$, and not the signal $Y_H$ as shown in FIG. 7B for simplicity.

Figure 7C:
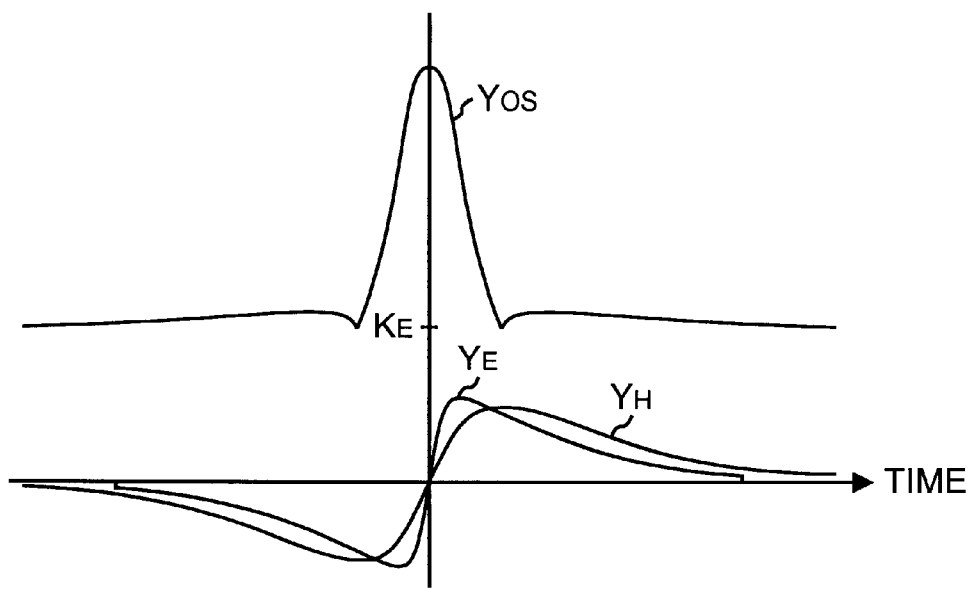

FIG. 7C shows plots of the signal $Y_H$ indicative of the detected edges, the signal $Y_{OS}$ indicative of the slope of the detected edge, and the signal $Y_E$ indicative of the enhanced edges. As shown in FIG. 6, the signal $Y_H$ is provided to the edge enhancement circuit and the signal $Y_{OS}$ is generated by processing the signal $Y_H$. The signal $Y_E$ is generated by multiplying a (delayed and cored) version of the signal $Y_H$ with the signal $Y_{OS}$. As indicated in FIG. 7C, the signal $Y_E$ has an edge that is sharper than that of the signal $Y_H$. However, the signal $Y_E$ approaches the signal $Y_H$ away from the edge center. These characteristics provide sharper edges with reduced amounts of undershoot and overshoot, if any.

The gain factor $K_S$ determines the amount of enhancement to be applied to the detected edges. As $K_S$ increases, the slope and magnitude of the signal $Y_E$ also increase. The gain factor $K_S$ tends to have more effect near the center of the detected edge (i.e., increased slope) and less effect away from the edge center. The offset factor $K_E$ controls the sharpness of the luminance edges. $K_E$ is typically 1.0, but higher values for $K_E$ further increase the sharpness of the edges. $K_E$ determines the amount of offset of the signal $Y_{HP}$, which in turn determines the amount of scaling of the signal $Y_E$.

Figure 7D:
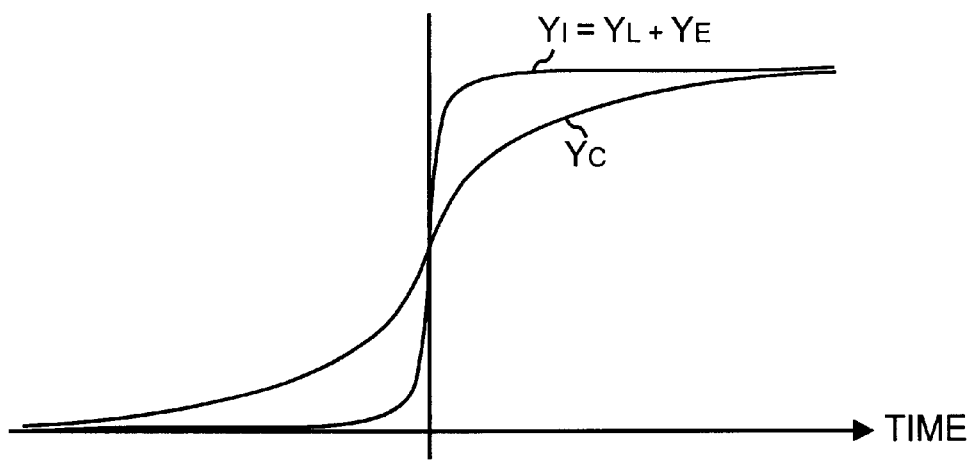

FIG. 7D shows plots of the luminance signal $Y_C$ and the output luminance signal $Y_I$. As shown in FIGS. 3A and 3B, combiner 316 and summer 336 each receives and combines the signal $Y_L$ with the signal $Y_E$ to generate the signal $Y_I$ (i.e., $Y_I=Y_L+Y_E$). The signal $Y_I$ has an enhanced edge as compared to that of the luminance signal $Y_C$.

As shown in FIGS. 7A through 7D, the signal $Y_E$ is a non-linear function of the signal $Y_H$. The signal $Y_H$ is scaled by an amount that varies across a particular detected edge. Specifically, the signal $Y_H$ is scaled by a large value near the center of the edge and smaller values away from the edge center. The variable amount of scaling across the detected edge provides several advantages. First, the detected edge is sharpened or enhanced by a particular amount that may be adjustable. Second, ringing, undershoot, and overshoot at the corners of the detected edge are reduced or minimized.

The invention has been described for a specific implementation of a non-linear function in which the signal $Y_H$ indicative of detected edges in the video signal is processed and combined (e.g., multiplied) with a delayed version of the signal $Y_H$. The non-linear function can also be implemented using other processes, and this is within the scope of the invention. For example, edges having amplitudes greater than a particular threshold value can be detected and, for these detected edges, enhancement can be performed for a particular time period centered near the center of the detected edges.

Figure 8:
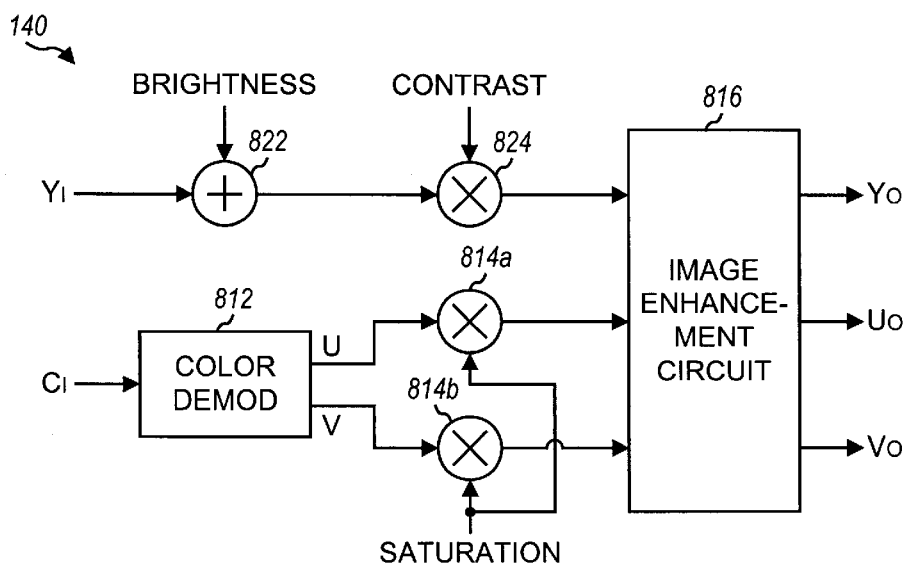
FIG. 8 shows a block diagram of an embodiment of a video demodulator.

FIG. 8 shows a block diagram of an embodiment of video demodulator 140. Video demodulator 140 receives and processes the luminance ($Y_I$) and chrominance ($C_I$) components from Y/C separator and luminance processor 130 and generates luminance ($Y_O$) and color difference ($U_O$ and $V_O$) components.

For an implementation in which the video samples are resampled at four times the subcarrier frequency, demodulation of the chrominance component can be easily achieved with a demultiplexer and a signal inversion circuit. At four times the subcarrier frequency, the inphase (i.e., cosine) sinusoid can be expressed as (1, 0, −1, 0, 1, 0, . . . ) and the quadrature (i.e., sine) sinusoid can be expressed as (0, 1, 0, −1, 0, 1, . . . ). The chrominance samples can be viewed as comprising the following sequence of samples (U, V, −U, −V, U, V, . . . ). Thus, every other chrominance sample can be provided as the U color difference sample, with alternate U color difference samples being inverted. Similarly, the remaining chrominance samples are provided as the V color difference samples, again with alternate V color difference samples being inverted. This simple color demodulation scheme is possible since burst-lock resampling is performed prior to color demodulation.

As shown in FIG. 8, the chrominance component $C_I$ is provided to a color demodulator 812 that demodulates the color component in the manner described above. The chrominance component can be bandpass filtered prior to demodulation to reduce chrominance noise. The output color difference components U and V are provided to multipliers 814a and 814b, respectively, that also receive a saturation value. Each multiplier 814 scales the received color difference component with the saturation value and provides the scaled component to an image enhancement circuit 816.

Multipliers 814 can be used to implement a chrominance automatic gain control (AGC) loop that adjusts the chrominance level to account for high frequency roll-off that is common in many video systems. The chrominance AGC loop can evaluate the amplitude of the color bursts and adjust the chrominance component such that the color burst amplitude is maintained at a particular signal level (e.g., +20 IRE). Multipliers 814 can also be used for adjustment of chrominance saturation.

The luminance component $Y_I$ is provided to a summer 822 that adds a brightness level to $Y_I$. The brightness adjusted Y is provided to a multiplier 824 that scales the received Y with a contrast level. The scaled Y is provided to image enhancement circuit 816.

Image enhancement circuit 816 performs additional signal processing on the luminance and color difference components. Additional processing on the luminance and color difference components can include sharpening and cornering to compensate for the limited signal bandwidth at the encoder.

Figure 9:
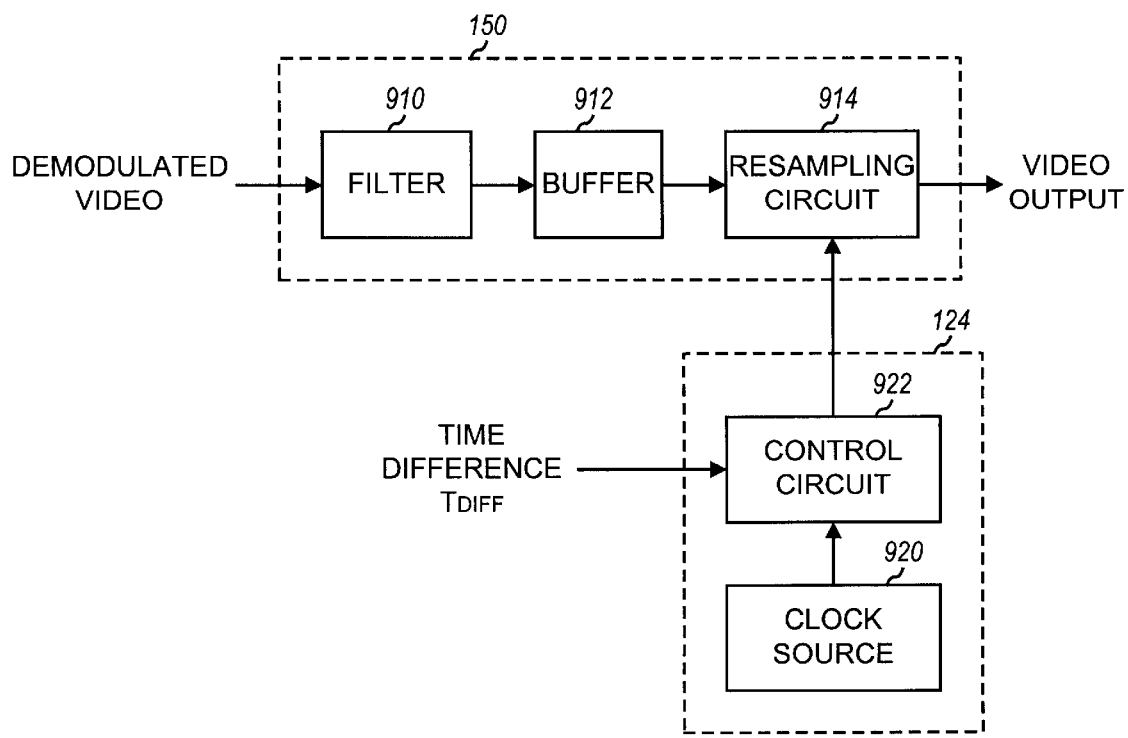
FIG. 9 shows a simplified block diagram of an embodiment of an output resampler.

FIG. 9 shows a simplified block diagram of an embodiment of output resampler 150. Resampler 150 receives and resamples the demodulated video samples from video demodulator 140 to provide output video samples. In an embodiment, the output video samples are also realigned in time to remove any picture misalignments caused by the input resampling, as described below.

Within resampler 150, the demodulated video samples are provided to an (optional) lowpass filter 910 that removes high frequency components to prevent aliasing when resampling to a lower output sample rate. The filtered samples are provided to a buffer 912 that provides the necessary buffering. The size of the buffer depends on the type of resampling being performed (e.g., horizontal resampling or vertical resampling, or both). The buffered samples are provided to a resampling circuit 914 that performs the resampling. In an embodiment, resampling circuit 914 is a linear interpolator that generates (or interpolates) samples at the output sample rate $f_{R2}$. Each interpolated sample z[i] is based on two filtered samples, d[i] and d[i+1], and a phase difference k[i] between the output sample z[i] and the filtered sample d[i]. Resampling circuit 914 can also be implemented using higher order interpolators, or with other resampling architectures, and this is within the scope of the invention.

Resampler 150 receives samples at an input sample rate $f_{R1}$ and generates resampled video samples at an output sample rate $f_{R2}$. In one specific embodiment, the output sampling rate $f_{R2}$ is determined by an external clock source provided to video decoder 100. In another specific embodiment, the output sampling rate is fixed at a particular frequency, and can be generated as a fraction of a reference clock such at the sampling clock for ADC 116. In yet another specific embodiment, the output sampling rate is determined by a PLL that is locked to the line rate of composite video input signal. These embodiments can be used to support various applications. Video decoder 100 can be designed to support any combination of output resampling schemes described above and other output resampling schemes.

In embodiments in which the output samples are generated with a time offset (e.g., based on the time difference indicated by the control signal) to align the decoded picture, resampler 150 behaves as a skew compensation circuit. The skew compensation circuit may generate output samples having the same or different sample rate as that of the input samples.

Resampler 150 can be used as a scaler to provide output samples at a different horizontal sample rate or a different vertical sample rate, or both. The scaler can be used to provide, for example, picture-in-picture (PIP) feature.

Figure 10:
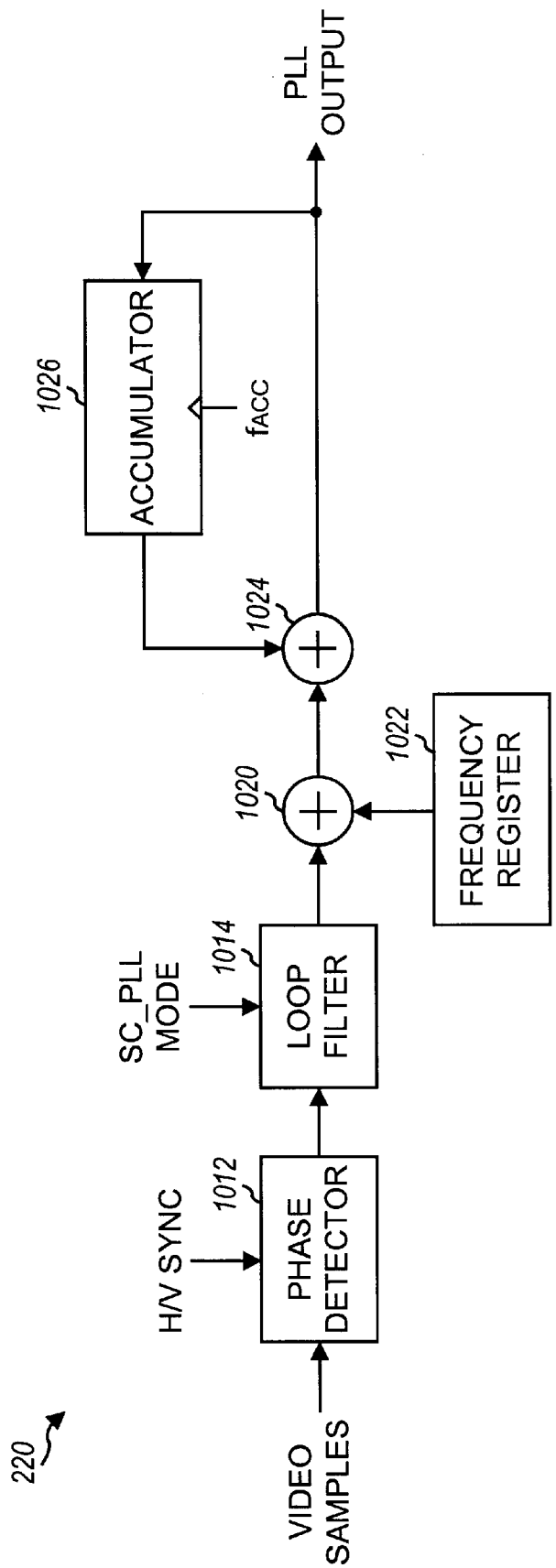
FIG. 10 shows a block diagram of an embodiment of a subcarrier PLL within a timing circuit in FIG. 2A.

FIG. 10 shows a block diagram of an embodiment of subcarrier PLL 220 within timing circuit 124 (see FIG. 2A). The resampled video samples from resampler 120 are provided to a phase detector 1012 that detects the phase error in the color bursts of the resampled video. When the resampling frequency $f_{R1}$ is phased-locked to the color subcarrier frequency $f_{SC}$ (e.g., $f_{R1}=4f_{SC}$), the resampled color bursts have a particular phase offset (e.g., zero) for each burst cycle. However, when the resampling frequency is not phased-locked to the color subcarrier frequency (e.g., $f_{R1}\neq 4f_{SC}$), the color bursts are sampled at varying locations and include varying phase errors. Phase detector 1012 is enabled only for time intervals when color bursts are present, as determined from the H/V SYNC signals.

Phase detector 1012 detects the color burst phase error and provides the detected phase error to a loop filter 1014. In an embodiment, loop filter 1014 operates in one of several operating modes (e.g., a fast mode and a slow mode), as determined by a control signal $SC_{13}$ PLL MODE. The fast mode has a wider loop bandwidth and provides shorter acquisition time and better frequency tracking when the signal is degraded. The fast mode can provide better performance for video signals from VCRs, especially during fast forward. However, if the bandwidth is excessively high, the color noise may be visible. The slow mode has a narrower loop bandwidth and provides reduced timing jitter caused by noise. The slow mode is typically used for higher quality video signals.

Loop filter 1014 filters or averages the phase error and provides the filtered error to a summer 1020. Summer 1020 also receives a frequency value from a frequency register 1022 and sums the two received values to generate an instantaneous frequency value that is provided to an NCO.

The NCO includes a summer 1024 and an accumulator 1026. Within the NCO, summer 1024 receives the instantaneous frequency value from summer 1020 and a phase value from accumulator 1026 and sums the two received values to generate an instantaneous phase value. This phase value is provided as the PLL output and is also stored back to accumulator 1026.

The NCO generates a synthesized clock signal from a reference (fixed) clock signal $f_{ACC}$. The reference clock signal can be the same as the sampling clock signal, or $f_{ACC}=f_{SAMP}$. The synthesized clock signal is then used to generate the resampling signal for resampler 120. The frequency of the synthesized clock signal can be expressed as follows:

$$f_{R1} = \frac{f_{VALUE}}{2^{ACC}} \cdot f_{ACC}, \qquad \text{Eq. (7)}$$

where $f_{VALUE}$ is the frequency value in register 1022, $f_{ACC}$ is the frequency of the clock signal for accumulator 1026, and ACC is the number of bits in accumulator 1026.

The PLL output from adder 1024 contains frequency and phase information of the synthesized clock signal used for resampling. The phase information is provided in the resampling signal used by resampler 120.

The edge enhancement techniques described above can be used with various video decoder architectures including an NTSC decoder, a PAL decoder, an MPEG decoder, and so on. Moreover, the edge enhancement techniques can generally be applied to signal processing (i.e., the processing of other types of signal besides video signals).

The invention can be implemented in various manners. For example, the invention can be implemented in hardware such as a processor, a micro-controller, a digital signal processor (DSP), an application specific integrated circuit (ASIC), or other circuits. The invention can also be implemented using software codes executed on a processor. The invention can also be implemented on a combination of hardware and software.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A circuit for enhancing edges in a video signal comprising:
    a luminance filter configured to receive the video signal and provide a lowpass signal and a first signal indicative of detected edges in the video signal;
    an edge enhancement circuit coupled to the luminance filter, the edge enhancement circuit configured to receive the first signal and provide a second signal that is a non-linear function of the first signal; and
    a combiner coupled to the luminance filter and the edge enhancement circuit, the combiner configured to receive and combine the lowpass and second signals to provide an output signal having enhanced edges.

2. The circuit of claim 1, wherein the second signal is dynamically generated based on characteristics of the detected edges in the video signal.

3. The circuit of claim 1, wherein the second signal provides varying amounts of enhancement across the detected edges in the video signal.

4. The circuit of claim 1, wherein for a particular detected edge, the second signal provides higher amounts of enhancement near a center of the particular detected edge and smaller amounts of enhancement away from the center.

5. The circuit of claim 1, wherein an amount of enhancement for a particular detected edge is dependent on a slope of a particular detected edge.

6. The circuit of claim 1, wherein the edge enhancement circuit is further configured to process the first signal to generate a third signal, and to multiply the first signal with the third signal to generate the second signal.

7. The circuit of claim 1, wherein the edge enhancement circuit comprises:
    an input filter configured to receive the first signal and provide a filtered signal having low frequency components removed, and
    wherein the second signal is generated based, in part, on the filtered signal.

8. The circuit of claim 7, wherein the input filter is implemented as a differential circuit.

9. The circuit of claim 7, wherein the edge enhancement circuit further comprises:
    a coring circuit configured to receive a version of the first signal and provide a cored signal in which low amplitude components less than a particular threshold value are removed, and
    wherein the second signal is generated based, in part, on the cored signal.

10. The circuit of claim 7, wherein the edge enhancement circuit further comprises:
    an absolute element operatively coupled to the input filter, the absolute element configured to receive the filtered signal and provide a signal having absolute values, and
    wherein the second signal is generated based, in part, on the signal having absolute values.

11. The circuit of claim 7, wherein the edge enhancement circuit further comprises:
    a scaling element operatively coupled to the input filter, the scaling element configured to receive and scale the filtered signal with a gain factor to generate a scaled signal, and wherein the second signal is generated based, in part, on the scaled signal.

12. The circuit of claim 11, wherein the edge enhancement circuit further comprises:
   a limiter coupled to the scaling element, the limiter configured to receive and limit the scaled signal to provide a limited signal, and
   wherein the second signal is generated based, in part, on the limited signal.

13. The circuit of claim 11, wherein the edge enhancement circuit further comprises:
   a summer coupled to the scaling element, the summer configured to receive and combine the scaled signal with an offset factor to provide an offsetted signal, and
   wherein the second signal is generated based, in part, on the offsetted signal.

14. The circuit of claim 13, wherein the edge enhancement circuit further comprises:
   a multiplier operatively coupled to the summer, the multiplier configured to receive and multiply a version of the first signal with the offsetted signal to provide the second signal.

15. The circuit of claim 1, wherein the luminance filter is configured to receive and filter the video signal to provide a lowpass signal, and to combine the lowpass signal with a luminance signal extracted from the video signal to provide the first signal.

16. The circuit of claim 1, wherein the luminance filter includes a two-dimensional filter.

17. The circuit of claim 16, wherein the two-dimensional filter is implemented as a finite impulse response (FIR) filter having a M×N transfer function.

18. The circuit of claim 16, wherein the two-dimensional filter is configured to average three or more samples in a horizontal direction.

19. The circuit of claim 16, wherein the two-dimensional filter is configured to average two or more video lines in a vertical direction.

20. The circuit of claim 19, wherein the three or more video lines are obtained by delaying the video signal with delay elements having variable delays.

21. The circuit of claim 16, wherein the two-dimensional filter is implemented as a decomposable filter comprises of a vertical filter coupled to a horizontal filter.

22. The circuit of claim 1, wherein video signal is a composite signal having a luminance component and a chrominance component.

23. The circuit of claim 1, wherein the video signal conforms to either NTSC, PAL, or SECAM standard.

24. The circuit of claim 1, wherein the video signal is sampled or resampled with a clock signal locked to an integer multiple of a color burst frequency of the video signal.

25. A circuit for enhancing edges in a video signal comprising:
   a luminance filter configured to receive the video signal and provide a lowpass signal and a first signal indicative of detected edges in the video signal;
   an edge enhancement circuit coupled to the luminance filter, the edge enhancement circuit configured to receive the first signal and provide a second signal that is dynamically generated based on characteristics of the detected edges in the video signal; and
   a combiner coupled to the luminance filter and the edge enhancement circuit, the combiner configured to receive and combine the lowpass and second signals to provide an output signal having enhanced edges.

26. The circuit of claim 25, wherein the second signal provides varying amounts of enhancement across the detected edges.

27. The circuit of claim 25, wherein for a particular detected edge, the second signal provides higher amounts of enhancement near a center of the particular detected edge and smaller amounts of enhancement away from the center.

28. The circuit of claim 25, wherein the second signal is generated by multiplying the first signal and a processed version of the first signal.

29. The circuit of claim 28, wherein the processed version of the first signal is generated by highpass or bandpass filtering the first signal.

30. A method for generating enhanced edges in a video signal comprising:
   filtering the video signal to provide a lowpass signal;
   combining the lowpass signal and a luminance signal extracted from the video signal to provide a first signal indicative of detected edges in the video signal;
   processing the first signal with a non-linear function to provide a second signal indicative of enhanced edges in the video signal; and
   combining the lowpass and second signals to provide an output signal having enhanced edges.

31. The method of claim 30, wherein the second signal is dynamically generated based on characteristics of the detected edges in the video signal.

32. The method of claim 30, further comprising:
   filtering the first signal to remove low frequency components;
   scaling the filtered first signal with a gain factor to generate a scaled signal; and
   combining the scaled signal with a version of the first signal to generate the second signal.

33. The method of claim 30, further comprising:
   summing the scaled signal with an offset factor to generate an offsetted signal; and
   multiplying the offsetted signal with a version of the first signal to generate the second signal.

34. A Y/C separator circuit comprising:
   at least one delay element coupled in series and configured to receive and delay a video signal, wherein each delay element provides one horizontal line of delay;
   a luminance filter coupled to zero or more of the at least one delay element, the luminance filter configured to receive the video signal and zero or more delayed signals and to provide a lowpass signal and a first signal indicative of detected edges in the video signal;
   an edge enhancement circuit coupled to the luminance filter, the edge enhancement circuit configured to receive the first signal and provide a second signal that is a non-linear function of the first signal;
   a combiner coupled to the luminance filter and the edge enhancement circuit, the combiner configured to receive and combine the lowpass and second signals to provide an output luminance signal having enhanced edges; and
   one or more adder circuits coupled to one or more of the at least one delay element, the one or more adder circuits configured to receive the video signal and one or more delayed signals and to provide a chrominance signal.

35. A video decoder for decoding, a composite video signal comprising:
   an input resampler configured to receive and resample input video samples with a first resampling signal to generate resampled video samples that define a resampled signal;

a Y/C separator coupled to the input resampler, the Y/C separator configured to receive and separate the resampled signal into a luminance signal and a chrominance signal, wherein the Y/C separator includes a luminance filter configured to receive the resampled signal and provide a lowpass signal and a first signal indicative of detected edges in the resampled signal, an edge enhancement circuit coupled to the luminance filter, the edge enhancement circuit configured to receive the first signal and provide a second signal indicative of enhanced edges in the resampled signal, a combiner coupled to the luminance filter and the edge enhancement circuit, the combiner configured to receive and combine the lowpass and second signals to provide an output signal having enhanced edges, and a chrominance filter configured to receive the resampled signal and provide the chrominance signal.

* * * * *